United States Patent
Nagasawa et al.

(10) Patent No.: US 11,333,800 B2
(45) Date of Patent: *May 17, 2022

(54) OPTICAL WAVEGUIDE-FORMING COMPOSITION WHICH CONTAINS REACTIVE SILSESQUIOXANE COMPOUND

(71) Applicant: NISSAN CHEMICAL CORPORATION, Tokyo (JP)

(72) Inventors: Takehiro Nagasawa, Funabashi (JP); Sayoko Tadokoro, Funabashi (JP); Tsubasa Kashino, Funabashi (JP); Kentaro Ohmori, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 327 days.

This patent is subject to a terminal disclaimer.

(21) Appl. No.: 16/609,079

(22) PCT Filed: Apr. 27, 2018

(86) PCT No.: PCT/JP2018/017254
§ 371 (c)(1),
(2) Date: Oct. 28, 2019

(87) PCT Pub. No.: WO2018/199305
PCT Pub. Date: Nov. 1, 2018

(65) Prior Publication Data
US 2020/0148875 A1 May 14, 2020

(30) Foreign Application Priority Data
Apr. 28, 2017 (JP) ............... JP2017-090221

(51) Int. Cl.
*C08L 35/02* (2006.01)
*G02B 1/04* (2006.01)

(52) U.S. Cl.
CPC .............. *G02B 1/045* (2013.01); *C08L 35/02* (2013.01)

(58) Field of Classification Search
CPC ................... G02B 1/045; C08L 35/02
(Continued)

(56) References Cited

U.S. PATENT DOCUMENTS

2004/0076391 A1 4/2004 Ghoshal et al.
2014/0051821 A1 2/2014 Popall et al.
(Continued)

FOREIGN PATENT DOCUMENTS

CN 106029721 A 10/2016
JP 2004-354547 A 12/2004
(Continued)

OTHER PUBLICATIONS

Nov. 27, 2020 Search Report issued in European Patent Application No. 18790050.1.
(Continued)

*Primary Examiner* — Christopher M Raabe
(74) *Attorney, Agent, or Firm* — Oliff PLC

(57) ABSTRACT

An optical waveguide-forming material has a low propagation loss even in a long wavelength region and has a high refractive index at a wavelength of 1,550 nm. An optical waveguide-forming composition includes (a) 100 parts by mass of a reactive silsesquioxane compound that is a polycondensation product of an alkoxysilane compound A of the following Formula [1]:

$$Ar^1\text{—}Si(OR^1)_3 \qquad [1]$$

and an alkoxysilane compound B of the following Formula [2]:

$$Ar^2\text{—}Si(OR^2)_3 \qquad [2]$$

(Continued)

and (b) 10 to 500 parts by mass of a fluorene compound of the following Formula [3]:

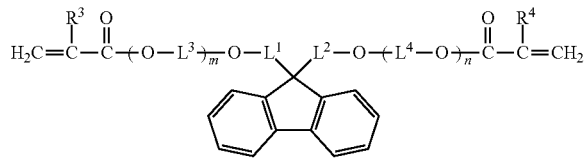

[3]

An optical waveguide can be formed by using the composition.

8 Claims, 1 Drawing Sheet

(58) Field of Classification Search
USPC .......................................................... 525/102
See application file for complete search history.

(56) References Cited

U.S. PATENT DOCUMENTS

2016/0369029 A1  12/2016  Ohmori et al.
2016/0369062 A1  12/2016  Popall et al.
2019/0292324 A1   9/2019  Nagasawa et al.
2020/0278611 A1*  9/2020  Su .......................... G03F 7/0046
2021/0032469 A1*  2/2021  Takeuchi ............. C09D 183/04

FOREIGN PATENT DOCUMENTS

| JP | 2005-275356 A | 10/2005 |
| JP | 2007-017481 A | 1/2007 |
| JP | 2013-133375 A | 7/2013 |
| JP | 2014-510159 A | 4/2014 |
| WO | 2017030090 A1 | 2/2017 |
| WO | 2017/069262 A1 | 4/2017 |

OTHER PUBLICATIONS

Jul. 17, 2018 Written Opinion issued in International Patent Application No. PCT/JP2018/017254.
Jul. 17, 2018 International Search Report issued in International Patent Application No. PCT/JP2018/017254.
Aug. 26, 2020 Office Action issued in Chinese Patent Application No. 201880026236.9.
Aug. 12, 2021 Office Action issued in Chinese Patent Application No. 201880026236.9.
Sep. 10, 2021 Office Action issued in Taiwanese Patent Application No. 107114503.
Mar. 2, 2022 Office Action issued in Japanese Patent Application No. 2019-514666.

* cited by examiner

OPTICAL WAVEGUIDE-FORMING COMPOSITION WHICH CONTAINS REACTIVE SILSESQUIOXANE COMPOUND

TECHNICAL FIELD

The present invention relates to an optical waveguide-forming composition, the composition having a low propagation loss and a high refractive index even in a long wavelength region.

BACKGROUND ART

In recent years, communication traffic has been increasing in association with the development of cloud computing and an increase in the number of smartphone users. Thus, problems have become apparent in data servers in which transmitted information data are concentrated; for example, the data servers use a huge amount of electricity, and the processing capacities of the data servers have almost reached their limits. Therefore, technical development is urgently needed for solving such problems. In this situation, vigorous attempts have been made to develop a technique regarding an optoelectronic hybrid substrate (also referred to as "optoelectronic composite substrate") wherein electrical wiring is partially replaced by optical wiring in a server board; i.e., a technique capable of high-density and high-speed data processing.

The optoelectronic hybrid substrate requires an optical waveguide; i.e., an optical transmission line, as well as an optical/electrical conversion element, which converts electrical signals into optical signals. Known techniques regarding the light source of such an optical/electrical conversion element include vertical cavity surface emitting laser (VCSEL) and silicon photonics. In particular, recent mainstream silicon photonics has been developed through application of semiconductor processes, such as CMOS and MEMS. Thus, the wavelength of light to be transmitted has been changed from 850 nm (i.e., wavelength for VCSEL) to a longer wavelength, such as 1,310 nm or 1,550 nm (i.e., wavelength for silicon photonics).

A conventional optical waveguide formed of a fluororesin (see, for example, Patent Document 1) has been known to exhibit high transparency in a long wavelength region, such as 1,310 nm or 1,550 nm. Such an optical waveguide achieves a low propagation loss through shifting of an absorption wavelength region by modification of a C—H bond (which shows absorption in such a long wavelength region) into a C—F bond.

A curved optical waveguide having a small bending radius or an optical waveguide to be disposed perpendicular to a substrate connected to an optical/electrical conversion element has been devised for mounting the optical waveguide on a substrate at a high density. Such an optical waveguide is required to increase the difference in refractive index between a core and a cladding for enhancing the effect of confining light guided through the waveguide. Thus, a core-forming material having high refractive index has been demanded.

PRIOR ART DOCUMENTS

Patent Documents

Patent Document 1: Japanese Unexamined Patent Application Publication No. 2005-275356 (JP 2005-275356 A)

SUMMARY OF THE INVENTION

Problems to be Solved by the Invention

However, a fluororesin achieving a low propagation loss in a long wavelength region has a refractive index as low as 1.3 to 1.5, which is not sufficient for application of the fluororesin to the aforementioned high-density optical waveguide. Thus, an optical waveguide-forming material has not yet been provided which has a low propagation loss even in a long wavelength region and has a high refractive index (e.g., 1.56 or more) at a wavelength of 1,550 nm, and therefore demand has arisen for development of such a material.

Means for Solving the Problems

The present inventors have conducted extensive studies for solving the aforementioned problems, and as a result have found that a composition containing a specific reactive silsesquioxane compound and a specific fluorene compound is suitable as a material for forming an optical waveguide achieving a low propagation loss and a high refractive index even in a long wavelength region. The present invention has been accomplished on the basis of this finding.

Accordingly, a first aspect of the present invention is an optical waveguide-forming composition comprising:

(a) 100 parts by mass of a reactive silsesquioxane compound that is a polycondensation product of an alkoxysilane compound A of the following Formula [1]:

$$Ar^1-Si(OR^1)_3 \qquad [1]$$

(wherein $Ar^1$ is a phenyl group having at least one group having a polymerizable double bond, a naphthyl group having at least one group having a polymerizable double bond, or a biphenyl group having at least one group having a polymerizable double bond; and $R^1$ is a methyl group or an ethyl group) and an alkoxysilane compound B of the following Formula [2]:

$$Ar^2-Si(OR^2)_3 \qquad [2]$$

(wherein $Ar^2$ is a phenyl group optionally substituted with a $C_{1-6}$ alkyl group, a condensed polycyclic aromatic hydrocarbon group optionally substituted with a $C_{1-6}$ alkyl group, or a hydrocarbon ring assembly group (optionally substituted with a $C_{1-6}$ alkyl group) in which a plurality of aromatic rings are directly joined by a single bond; and $R^2$ is a methyl group or an ethyl group) and;

(b) 10 to 500 parts by mass of a fluorene compound of the following Formula [3]:

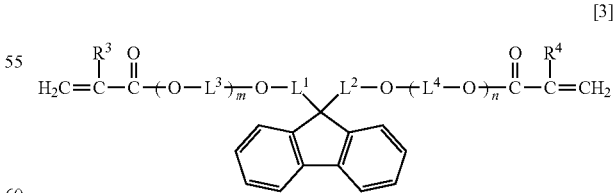

[3]

(wherein $R^3$ and $R^4$ are each independently a hydrogen atom or a methyl group; $L^1$ and $L^2$ are each independently a phenylene group optionally having a substituent or a naphthalenediyl group optionally having a substituent; $L^3$ and $L^4$ are each independently a $C_{1-6}$ alkylene group; and m and n are each zero or a positive integer such that m+n is 0 to 40).

A second aspect of the present invention is the optical waveguide-forming composition according to the first aspect, wherein the composition further comprises (c) 1 to 100 parts by mass of a (meth)acrylate compound not belonging to the fluorene compound (b) relative to 100 parts by mass of the total amount of the reactive silsesquioxane compound (a) and the fluorene compound (b).

A third aspect of the present invention is the optical waveguide-forming composition according to the second aspect, wherein the (meth)acrylate compound (c) comprises at least an aromatic ring-containing (meth)acrylate compound.

A fourth aspect of the present invention is the optical waveguide-forming composition according to the second or third aspect, wherein the (meth)acrylate compound (c) comprises at least a mono(meth)acrylate compound.

A fifth aspect of the present invention is the optical waveguide-forming composition according to the second aspect, wherein the (meth)acrylate compound (c) comprises at least an aromatic ring-containing mono(meth)acrylate compound.

A sixth aspect of the present invention is the optical waveguide-forming composition according to any one of the first to fifth aspects, wherein the reactive silsesquioxane compound (a) is a polycondensation product of a compound of the following Formula [1a]:

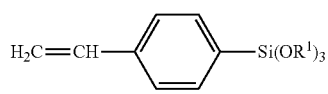
[1a]

(wherein $R^1$ has the same meaning as defined above) and a compound of the following Formula [2a]:

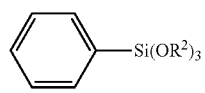
[2a]

(wherein $R^2$ has the same meaning as defined above).

A seventh aspect of the present invention is a cured product produced by curing the optical waveguide-forming composition according to any one of the first to sixth aspects.

An eighth aspect of the present invention is an optical waveguide produced from the optical waveguide-forming composition according to any one of the first to sixth aspects.

Effects of the Invention

The optical waveguide-forming composition of the present invention has superior optical characteristics; i.e., a high refractive index and a low optical propagation loss even in a long wavelength region (e.g., about 1,550 nm), and thus is useful as an optical waveguide-forming material.

The optical waveguide-forming composition of the present invention can form an optical waveguide by photolithography. In addition, the composition can form an optical waveguide (so-called optical pin) having a desired inclination angle with respect to the surface of a substrate.

The present invention is expected to provide an optical waveguide having very high transparency (low propagation loss) in a long wavelength region.

MODES FOR CARRYING OUT THE INVENTION

<<Optical Waveguide-Forming Composition>>

Figure 1:
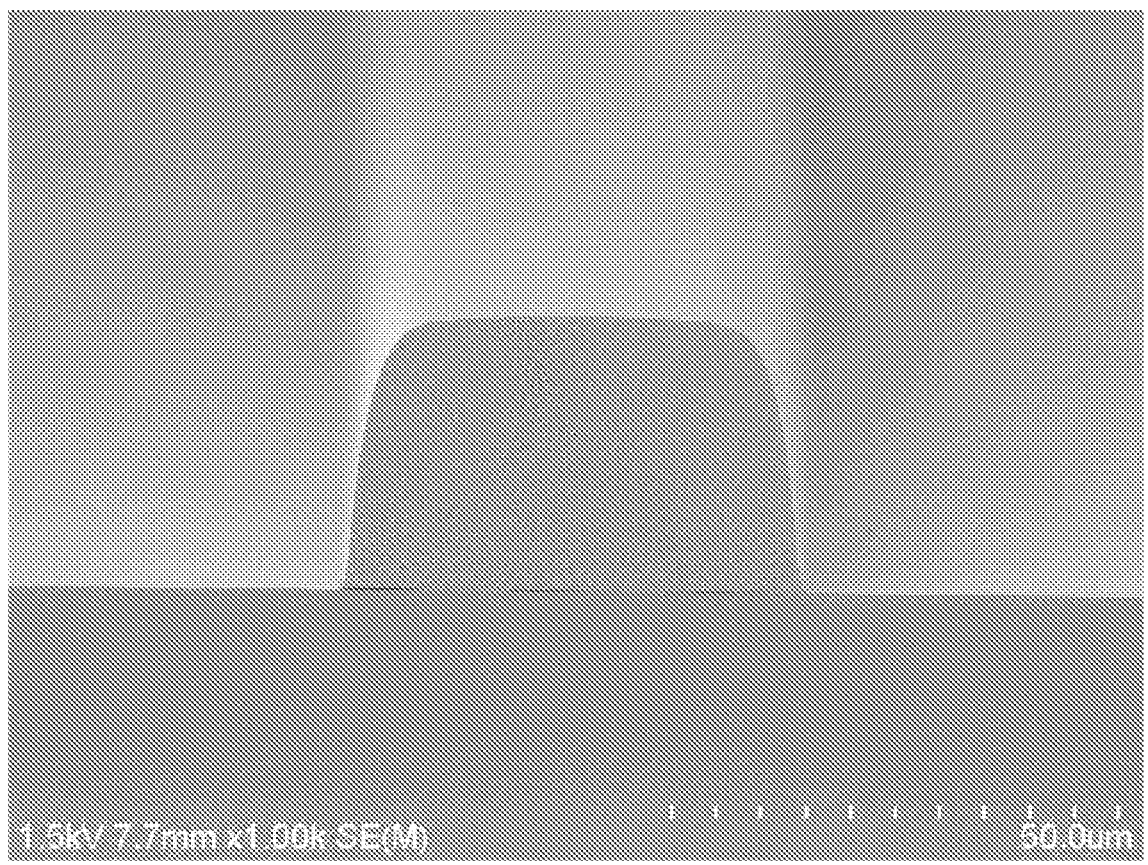
FIG. 1 shows an image of an optical waveguide produced in Example 2 as observed with an SEM.

The optical waveguide-forming composition of the present invention contains a specific reactive silsesquioxane compound as a component (a) and a specific fluorene compound as a component (b).

These components will next be described in detail.

<(a) Reactive Silsesquioxane Compound>

The reactive silsesquioxane compound (a) used in the present invention is a polycondensation product of an alkoxysilane compound A having a specific structure and an alkoxysilane compound B having a specific structure, which will be described below. Specifically, the reactive silsesquioxane compound (a) is prepared by polycondensation of these compounds A and B in the presence of an acid or a base.

[Alkoxysilane Compound A]

The alkoxysilane compound A is a compound of the following Formula [1].

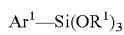
[1]

In Formula [1], $Ar^1$ is a phenyl group having at least one group having a polymerizable double bond, a naphthyl group having at least one group having a polymerizable double bond, or a biphenyl group having at least one group having a polymerizable double bond; and $R^1$ is a methyl group or an ethyl group.

Examples of the phenyl group having at least one group having a polymerizable double bond represented by $Ar^1$ include 2-vinylphenyl group, 3-vinylphenyl group, 4-vinylphenyl group, 4-vinyloxyphenyl group, 4-allylphenyl group, 4-allyloxyphenyl group, and 4-isopropenylphenyl group.

Examples of the naphthyl group having at least one group having a polymerizable double bond represented by $Ar^1$ include 4-vinylnaphthalen-1-yl group, 5-vinylnaphthalen-1-yl group, 6-vinylnaphthalen-2-yl group, 4-allyloxynaphthalen-1-yl group, 5-allyloxynaphthalen-1-yl group, 8-allyloxynaphthalen-1-yl group, 5-vinyloxynaphthalen-1-yl group, 4-allylnaphthalen-1-yl group, 5-allylnaphthalen-1-yl group, and 5-isopropenylnaphthalen-1-yl group.

Examples of the biphenyl group having at least one group having a polymerizable double bond represented by $Ar^1$ include 4'-vinyl-[1,1'-biphenyl]-2-yl group, 4'-vinyl-[1,1'-biphenyl]-3-yl group, 4'-vinyl-[1,1'-biphenyl]-4-yl group, 4'-vinyloxy-[1,1'-biphenyl]-4-yl group, 4'-allyl-[1,1'-biphenyl]-4-yl group, 4'-allyloxy-[1,1'-biphenyl]-4-yl group, and 4'-isopropenyl-[1,1'-biphenyl]-4-yl group.

Specific examples of the compound of Formula [1] include, but are not limited to, trimethoxy(4-vinylphenyl)silane, triethoxy(4-vinylphenyl)silane, (4-isopropenylphenyl)trimethoxysilane, trimethoxy(4-vinyl-1-naphthyl)silane, and trimethoxy(4'-vinyl-[1,1'-biphenyl]-4-yl)silane.

[Alkoxysilane Compound B]

The alkoxysilane compound B is a compound of the following Formula [2].

$$Ar^2-Si(OR^2)_3 \quad [2]$$

In Formula [2], $Ar^2$ is a phenyl group optionally substituted with a $C_{1-6}$ alkyl group, a condensed polycyclic aromatic hydrocarbon group optionally substituted with a $C_{1-6}$ alkyl group, or a hydrocarbon ring assembly group (optionally substituted with a $C_{1-6}$ alkyl group) in which a plurality of aromatic rings are directly joined by a single bond; and $R^2$ is a methyl group or an ethyl group.

Examples of the phenyl group optionally substituted with a $C_{1-6}$ alkyl group represented by $Ar^2$ include phenyl group, o-tolyl group, m-tolyl group, p-tolyl group, 2,4,6-trimethylphenyl group, and 4-tert-butylphenyl group.

Examples of the condensed polycyclic aromatic hydrocarbon group represented by $Ar^2$ include monovalent groups derived from naphthalene, phenanthrene, anthracene, triphenylene, pyrene, chrysene, naphthacene, biphenylene, and fluorene.

Examples of the hydrocarbon ring assembly group in which a plurality of aromatic rings are directly joined by a single bond include monovalent groups derived from biphenyl, terphenyl, quaterphenyl, binaphthalene, phenylnaphthalene, phenylfluorene, and diphenylfluorene.

Examples of the $C_{1-6}$ alkyl group that may be possessed as a substituent by the aforementioned phenyl group, condensed polycyclic aromatic hydrocarbon group, and hydrocarbon ring assembly group include methyl group, ethyl group, n-propyl group, isopropyl group, n-butyl group, isobutyl group, sec-butyl group, tert-butyl group, n-pentyl group, cyclopentyl group, n-hexyl group, and cyclohexyl group.

Among the aforementioned examples, $Ar^2$ is preferably a phenyl group optionally substituted with a $C_{1-6}$ alkyl group.

Specific examples of the compound of Formula [2] include, but are not limited to, trimethoxy(phenyl)silane, triethoxy(phenyl)silane, trimethoxy(p-tolyl)silane, trimethoxy(1-naphthyl)silane, triethoxy(1-naphthyl)silane, trimethoxy(2-naphthyl)silane, triethoxy(2-naphthyl)silane, trimethoxy(2-phenanthryl)silane, trimethoxy(3-phenanthryl)silane, trimethoxy(9-phenanthryl)silane, triethoxy(9-phenanthryl)silane, [1,1'-biphenyl]-4-yltrimethoxysilane, and [1,1'-biphenyl]-4-yltriethoxysilane.

In particular, the reactive silsesquioxane compound as the component (a) is preferably a reactive silsesquioxane compound prepared by polycondensation of a compound of the following Formula [1a] and a compound of the following Formula [2a] in the presence of an acid or a base.

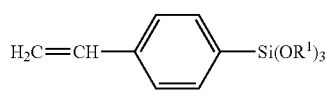

[1a]

In Formula [1a], $R^1$ has the same meaning as defined above.

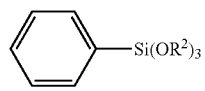

[2a]

In Formula [2a], $R^2$ has the same meaning as defined above.

[Mixing Ratio of Alkoxysilane Compound A and Alkoxysilane Compound B]

No particular limitation is imposed on the mixing ratio by mole of the alkoxysilane compound A of Formula [1] and the alkoxysilane compound B of Formula [2] used for polycondensation reaction to prepare the reactive silsesquioxane compound as the component (a). Generally, the ratio by mole of the alkoxysilane compound A to the alkoxysilane compound B is preferably 5:1 to 1:5, more preferably 3:1 to 1:3, in order to stabilize the physical properties of the resultant cured product. When the mixing ratio by mole of the alkoxysilane compound A to the alkoxysilane compound B is 5 or less, the resultant cured product can achieve a higher refractive index. When the mixing ratio by mole of the alkoxysilane compound A to the alkoxysilane compound B is ⅕ or more, a sufficient crosslink density is achieved, and the dimensional stability to heat is further improved.

Suitable compounds may optionally be selected as the alkoxysilane compounds A and B, or a plurality of compounds may be used in combination as each of the alkoxysilane compounds A and B. In such a case, the mixing ratio by mole of the total amount of the alkoxysilane compounds A to the total amount of the alkoxysilane compounds B falls within the aforementioned range.

[Acidic or Basic Catalyst]

The polycondensation reaction between the alkoxysilane compound A of Formula [1] and the alkoxysilane compound B of Formula [2] is suitably performed in the presence of an acidic or basic catalyst.

No particular limitation is imposed on the type of the catalyst used for the aforementioned polycondensation reaction, so long as it dissolves or is homogeneously dispersed in a solvent described below. The catalyst to be used can be selected as appropriate.

Examples of usable catalysts include acidic compounds, such as inorganic acids (e.g., hydrochloric acid, nitric acid, and sulfuric acid), and organic acids (e.g., acetic acid and oxalic acid); basic compounds, such as alkali metal hydroxides, alkaline earth metal hydroxides, ammonium hydroxide, quaternary ammonium salts, and amines; and fluoride salts, such as $NH_4F$ and $NR_4F$, wherein R is one or more groups selected from the group consisting of a hydrogen atom, a linear alkyl group having a carbon atom number of 1 to 12, a branched alkyl group having a carbon atom number of 3 to 12, and a cyclic alkyl group having a carbon atom number of 3 to 12.

These catalysts may be used alone or in combination of plural species.

Examples of the acidic compounds include hydrochloric acid, nitric acid, sulfuric acid, acetic acid, oxalic acid, and boric acid.

Examples of the basic compounds include sodium hydroxide, potassium hydroxide, magnesium hydroxide, calcium hydroxide, strontium hydroxide, barium hydroxide, ammonium hydroxide, tetramethylammonium hydroxide, tetraethylammonium hydroxide, tetrabutylammonium hydroxide, and triethylamine.

Examples of the fluoride salts include ammonium fluoride, tetramethylammonium fluoride, and tetrabutylammonium fluoride.

Among these catalysts, preferred are one or more species selected from the group consisting of hydrochloric acid, acetic acid, potassium hydroxide, calcium hydroxide, barium hydroxide, and tetraethylammonium hydroxide.

The amount of the catalyst to be used is 0.01 to 10% by mass, preferably 0.1 to 5% by mass, relative to the total mass of the alkoxysilane compounds A and B. When the amount of the catalyst to be used is 0.01% by mass or more, the reaction proceeds more effectively. A sufficient amount of the catalyst to be used is 10% by mass or less from the economical viewpoint.

[Polycondensation Reaction]

One characteristic feature of the reactive silsesquioxane compound according to the present invention is the structure of the alkoxysilane compound A. The reactive group (polymerizable double bond) contained in the alkoxysilane compound A used in the present invention is readily involved in polymerization with radicals or cations, and the polymerized (cured) product exhibits high thermal resistance.

The hydrolytic polycondensation reaction between the alkoxysilane compounds A and B can be performed in the absence of a solvent. However, a solvent inert to both these alkoxysilane compounds (e.g., tetrahydrofuran (THF) described below) can be used as a reaction solvent. The use of such a reaction solvent is advantageous in that the reaction system is readily made homogeneous, and the polycondensation reaction can be performed more stably.

As described above, the synthesis reaction of the reactive silsesquioxane compound may be performed in the absence of a solvent, or a solvent may be used to make the reaction system more homogeneous. No particular limitation is imposed on the solvent, so long as it does not react with both the alkoxysilane compounds, and dissolves the resultant polycondensation product.

Examples of such reaction solvents include ketones, such as acetone and methyl ethyl ketone (MEK); aromatic hydrocarbons, such as benzene, toluene, and xylene; ethers, such as tetrahydrofuran (THF), 1,4-dioxane, diisopropyl ether, and cyclopentyl methyl ether (CPME); glycols, such as ethylene glycol, propylene glycol, and hexylene glycol; glycol ethers, such as ethyl cellosolve, butyl cellosolve, ethyl carbitol, butyl carbitol, diethyl cellosolve, and diethyl carbitol; and amides, such as N-methyl-2-pyrrolidone (NMP) and N,N-dimethylformamide (DMF). These solvents may be used alone or in combination of two or more species.

The reactive silsesquioxane compound used in the present invention is prepared by hydrolytic polycondensation of the alkoxysilane compound A of Formula [1] and the alkoxysilane compound B of Formula [2] in the presence of an acidic or basic catalyst. The reaction temperature for the hydrolytic polycondensation is 20 to 150° C., more preferably 30 to 120° C.

No particular limitation is imposed on the reaction time, so long as it is longer than a time required for termination of an increase in the molecular weight of the polycondensation product, and for stabilization of the molecular weight distribution. More specifically, the reaction time is several hours to several days.

After completion of the polycondensation reaction, the resultant reactive silsesquioxane compound is recovered by any process, such as filtration or solvent distillation, preferably and then optionally subjected to a suitable purification treatment.

The reactive silsesquioxane compound may also be prepared by polycondensation of the alkoxysilane compound A of Formula [1] and the alkoxysilane compound B of Formula [2] in the presence of a base, and subsequent removal of the base with a cation-exchange resin.

The base used for the polycondensation may be one or more compounds selected from the group consisting of the aforementioned basic compounds and fluoride salts, and the amount of the base to be used may be the same as described above. Preferably, one or more species selected from the group consisting of potassium hydroxide, calcium hydroxide, barium hydroxide, and tetraethylammonium hydroxide can be used as the base.

The reaction conditions, the reaction solvent, etc. used for the polycondensation reaction may be the same as those described above.

After completion of the reaction, an ion-exchange resin having a sulfo group as an ionic group is preferably used as the cation-exchange resin for removal of the base.

The polycondensation product (reactive silsesquioxane compound) prepared through the aforementioned reaction has a weight average molecular weight Mw of 500 to 100,000, preferably 500 to 30,000, as measured by GPC in terms of polystyrene, and a degree of distribution Mw (weight average molecular weight)/Mn (number average molecular weight) of 1.0 to 10.

The reactive silsesquioxane compound (a) has a cross-linked structure including at least siloxane units of $[Ar^1SiO_{3/2}]$ and $[Ar^2SiO_{3/2}]$.

<(b) Fluorene Compound>

The fluorene compound (b) used in the present invention is a compound of the following Formula [3].

[3]

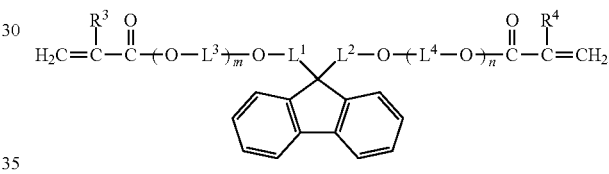

In Formula [3], $R^3$ and $R^4$ are each independently a hydrogen atom or a methyl group; $L^1$ and $L^2$ are each independently a phenylene group optionally having a substituent or a naphthalenediyl group optionally having a substituent; $L^3$ and $L^4$ are each independently a $C_{1-6}$ alkylene group; and m and n are each zero or a positive integer such that m+n is 0 to 40.

Examples of the phenylene group optionally having a substituent represented by $L^1$ and $L^2$ include o-phenylene group, m-phenylene group, p-phenylene group, 2-methylbenzene-1,4-diyl group, 2-aminobenzene-1,4-diyl group, 2,4-dibromobenzene-1,3-diyl group, and 2,6-dibromobenzene-1,4-diyl group.

Examples of the naphthalenediyl group optionally having a substituent represented by $L^1$ and $L^2$ include 1,2-naphthalenediyl group, 1,4-naphthalenediyl group, 1,5-naphthalenediyl group, 1,8-naphthalenediyl group, 2,3-naphthalenediyl group, and 2,6-naphthalenediyl group.

Examples of the $C_{1-6}$ alkylene group represented by $L^3$ and $L^4$ include methylene group, ethylene group, trimethylene group, 1-methylethylene group, tetramethylene group, 1-methyltrimethylene group, 1,1-dimethylethylene group, pentamethylene group, 1-methyltetramethylene group, 2-methyltetramethylene group, 1,1-dimethyltrimethylene group, 1,2-dimethyltrimethylene group, 2,2-dimethyltrimethylene group, 1-ethyltrimethylene group, hexamethylene group, 1-methylpentamethylene group, 2-methylpentamethylene group, 3-methylpentamethylene group, 1,1-dimethyltetramethylene group, 1,2-dimethyltetramethylene group, 2,2-dimethyltetramethylene group, 1-ethyltetramethylene group, 1,1,2-trimethyltrimethylene group, 1,2,2-trimethyltrimethylene group, 1-ethyl-1-methyltrimethylene group, and 1-ethyl-2-methyltrimethylene group.

In the compound of Formula [3], m and n preferably satisfy the condition where m+n is 0 to 30, more preferably satisfy the condition where m+n is 2 to 20.

Specific examples of the compound of Formula [3] include, but are not limited to, 9,9-bis(4-(2-(meth)acryloyloxyethoxy)phenyl)-9H-fluorene, OGSOL (registered trademark) EA-0200, EA-0300, EA-F5003, EA-F5503, EA-F5510, EA-F5710 and GA-5000 [available from Osaka Gas Chemicals Co., Ltd.], and NK Ester A-BPEF [available from Shin Nakamura Chemical Co., Ltd.] (the term "(meth) acryloyl group" as used herein refers to both an acryloyl group and a methacryloyl group).

In the optical waveguide-forming composition of the present invention, the amount of the component (b) is 10 to 500 parts by mass, particularly preferably 30 to 250 parts by mass, relative to 100 parts by mass of the component (a).

<(c) (Meth)Acrylate Compound not Belonging to Fluorene Compound (b)>

The optical waveguide-forming composition of the present invention may further contain, as a component (c), a (meth)acrylate compound not belonging to the fluorene compound (b). The term "(meth)acrylate" as used herein refers to both an acrylate and a methacrylate.

Preferably, the composition contains, as the component (c), at least an aromatic ring-containing (meth)acrylate compound, or at least a mono(meth)acrylate compound. In particular, the composition preferably contains at least an aromatic ring-containing mono(meth)acrylate compound as the component (c).

Examples of the (meth)acrylate compound as the component (c) include mono(meth)acrylate compounds, such as methyl (meth)acrylate, ethyl (meth)acrylate, n-propyl (meth)acrylate, isopropyl (meth)acrylate, tert-butyl (meth) acrylate, 2,2,2-trifluoroethyl (meth)acrylate, 2-hydroxyethyl (meth)acrylate, 2-hydroxypropyl (meth)acrylate, 2,3-dihydroxypropyl (meth)acrylate, 4-hydroxybutyl (meth)acrylate, phenyl (meth)acrylate, benzyl (meth)acrylate, 1-phenylethyl (meth)acrylate, 2-phenylethyl (meth)acrylate, 1-naphthyl (meth)acrylate, 1-naphthylmethyl (meth)acrylate, 2-naphthyl (meth)acrylate, 2-naphthylmethyl (meth)acrylate, 9-anthryl (meth)acrylate, 9-anthrylmethyl (meth)acrylate, 9-phenanthryl (meth)acrylate, 9-phenanthrylmethyl (meth) acrylate, 1-phenoxyethyl (meth)acrylate, 2-phenoxyethyl (meth)acrylate, 2-phenoxybenzyl (meth)acrylate, 3-phenoxybenzyl (meth)acrylate, 4-phenoxybenzyl (meth)acrylate, 2-(2-biphenylyloxy)ethyl (meth)acrylate, 2-(3-biphenylyloxy)ethyl (meth)acrylate, 2-(4-biphenylyloxy)ethyl (meth)acrylate, and ethylene oxide-modified o-phenylphenol (meth)acrylate; and polyfunctional (meth)acrylate compounds, such as neopentyl glycol di(meth)acrylate, pentaerythritol tri(meth)acrylate, trimethylolethane tri(meth) acrylate, trimethylolpropane tri(meth)acrylate, pentaerythritol tetra(meth)acrylate, ditrimethylolpropane tetra(meth)acrylate, dipentaerythritol penta(meth)acrylate, dipentaerythritol hexa(meth)acrylate, bisphenol A di(meth) acrylate, ethylene oxide-modified bisphenol A di(meth)acrylate, 2-(5-ethyl-5-hydroxymethyl-1,3-dioxan-2-yl)-2-methylpropan-1-ol di(meth)acrylate, ethylene oxide-modified 2-(5-ethyl-5-hydroxymethyl-1,3-dioxan-2-yl)-2-methylpropan-1-ol di(meth)acrylate, and propylene oxide-modified 2-(5-ethyl-5-hydroxymethyl-1,3-dioxan-2-yl)-2-methylpropan-1-ol di(meth)acrylate.

Of these, preferred are benzyl (meth)acrylate, 2-phenoxyethyl (meth)acrylate, 2-phenoxybenzyl (meth)acrylate, 3-phenoxybenzyl (meth)acrylate, 4-phenoxybenzyl (meth) acrylate, 2-(2-biphenylyloxy)ethyl (meth)acrylate, 2-(3-biphenylyloxy)ethyl (meth)acrylate, 2-(4-biphenylyloxy)ethyl (meth)acrylate, and ethylene oxide-modified o-phenylphenol (meth)acrylate; more preferred are benzyl (meth)acrylate, 3-phenoxybenzyl (meth)acrylate, 2-(2-biphenylyloxy) ethyl (meth)acrylate, and ethylene oxide-modified o-phenylphenol (meth)acrylate; and still more preferred is benzyl (meth)acrylate.

Also, 2-(5-ethyl-5-hydroxymethyl-1,3-dioxan-2-yl)-2-methylpropan-1-ol di(meth)acrylate is preferred.

These (meth)acrylate compounds are readily commercially available. Examples of commercially available products include HEA, HPA, 4-HBA, AIB, TBA, Viscoat 3F, 4F, 8F, 8FM, #295, #300, #802, #160, #192, #700HV, and #540 [available from OSAKA ORGANIC CHEMICAL INDUSTRY LTD.]; Light Acrylate NP-A, TMP-A, PE-3A, PE-4A, DPE-6A, PO-A, P2H-A, P-200A, BA-104, BP-4EAL, BP-4PA, Light Ester E, NB, IB, TB, M-3F, HOA(N), 110-250(N), HOP(N), HOP-A(N), HOB(N), NP, TMP, BZ, PO, and BP-2EMK [available from Kyoeisha Chemical Co., Ltd.]; NK Ester NPG, A-TMM-3, A-TMM-3L, A-TMM-3LM-N, A-TMPT, TMPT, A-TMMT, AD-TMP, A-9550, A-DPH, AMP-20GY, PHE-1G, A-LEN-10, ABE-300, A-BPE-4, A-BPE-10, A-BPE-20, A-BPE-30, A-BPP-3, A-B1206PE, BPE-80N, BPE-100, BPE-200, BPE-500, BPE-900, BPE-1300N, A-9300, A-9300-1CL, and A-DOG [available from Shin Nakamura Chemical Co., Ltd.]; Aronix (registered trademark) M-309, M-306, M-305, M-303, M-452, M-450, M-408, M-403, M-400, M-402, M-404, M-406, M-405, M-101A, M-102, M-106, M-110, M-111, M-113, M-117, M-5700, M-208, M-211B, M-215, M-313, and M-315 [available from TOAGOSEI CO., LTD.]; Blemmer (registered trademark) AAE-300, PAE-100, 43PAPE-600B, ANP-300, 75ANEP-600, PDBE-200, PDBE-250, PDBE-450, PDBE-1300, and PDBPE [available from NOF CORPORATION]; and KAYARAD NPGDA, TMPTA, PET-30, T-1420(T), D-310, DPHA, DPCA-20, DPCA-30, DPCA-60, DPCA-120, R-128H, R-551, and R-712 [available from Nippon Kayaku Co., Ltd.].

In the case of incorporation of the (meth)acrylate compound (c) not belonging to the fluorene compound (b), a single (meth)acrylate compound may be used, or two or more (meth)acrylate compounds may be used in combination. The amount of the (meth)acrylate compound (c) is 1 to 50 parts by mass, preferably 1 to 25 parts by mass, more preferably 5 to 25 parts by mass, relative to 100 parts by mass of the total amount of the components (a) and (b).

<Other Additives>

The optical waveguide-forming composition of the present invention may optionally further contain, for example, a polymerization initiator, a chain transfer agent, an antioxidant, an ultraviolet absorber, a photostabilizer, a leveling agent, a rheology-controlling agent, an adhesion adjuvant such as a silane coupling agent, a pigment, a dye, or a defoaming agent, so long as the effects of the present invention are not impaired. The composition may also contain other polymerizable compounds.

The aforementioned polymerization initiator may be any of a photopolymerization initiator and a thermal polymerization initiator.

Examples of the photopolymerization initiator include alkylphenones, benzophenones, acylphosphine oxides, Michler's benzoylbenzoates, oxime esters, tetramethylthiuram monosulfides, and thioxanthones.

In particular, a photocleavable photoradical polymerization initiator is preferred. Examples of the photocleavable photoradical polymerization initiator include those described in "Saishin UV Koka Gijutsu" ("Latest UV Curing Technology") (p. 159, publisher: Kazuhiro Takausu, published by TECHNICAL INFORMATION INSTITUTE CO., LTD, 1991).

Examples of commercially available photoradical polymerization initiators include IRGACURE (registered trademark) 184, 369, 651, 500, 819, 907, 784, 2959, CGI1700, CGI1750, CGI1850, CG24-61, and TPO, and Darocur (registered trademark) 1116 and 1173 [available from BASF Japan Ltd.]; and ESACURE KIP150, KIP65LT, KIP100F, KT37, KT55, KTO46, and KIP75 [available from Lamberti].

Examples of the thermal polymerization initiator include azo compounds and organic peroxides.

Examples of commercially available azo-based thermal polymerization initiators include V-30, V-40, V-59, V-60, V-65, and V-70 [available from FUJIFILM Wako Pure Chemical Corporation (former Wako Pure Chemical Industries, Ltd.)].

Examples of commercially available organic peroxide-based thermal polymerization initiators include, but are not limited to, Perkadox (registered trademark) CH, BC-FF, 14, and 16, Trigonox (registered trademark) 22, 23, and 121, Kayaester (registered trademark) P and O, and Kayabutyl (registered trademark) B [available from Kayaku Akzo Corporation]; and PERHEXA (registered trademark) HC, PERCUMYL (registered trademark) H, PEROCTA (registered trademark) O, PERHEXYL (registered trademark) O and Z, and PERBUTYL (registered trademark) O and Z (available from NOF Corporation).

In the case of incorporation of a polymerization initiator, a single polymerization initiator may be used, or two or more polymerization initiators may be used in combination. The amount of the polymerization initiator is 0.1 to 20 parts by mass, more preferably 0.3 to 10 parts by mass, relative to 100 parts by mass of the total amount of the polymerizable components (i.e., the components (a) and (b)), or 100 parts by mass of the total amount of the components (a) to (c) (in the case of incorporation of the component (c)).

Examples of the aforementioned chain transfer agent include thiol compounds, for example, mercaptocarboxylic acid esters, such as methyl mercaptoacetate, methyl 3-mercaptopropionate, 2-ethylhexyl 3-mercaptopropionate, 3-methoxybutyl 3-mercaptopropionate, n-octyl 3-mercaptopropionate, stearyl 3-mercaptopropionate, 1,4-bis(3-mercaptopropionyloxy)butane, 1,4-bis(3-mercaptobutyryloxy)butane, trimethylolethane tris(3-mercaptopropionate), trimethylolethane tris(3-mercaptobutyrate), trimethylolpropane tris(3-mercaptopropionate), trimethylolpropane tris(3-mercaptobutyrate), pentaerythritol tetrakis(3-mercaptopropionate), pentaerythritol tetrakis(3-mercaptobutyrate), dipentaerythritol hexakis(3-mercaptopropionate), dipentaerythritol hexakis(3-mercaptobutyrate), tris[2-(3-mercaptopropionyloxy)ethyl] isocyanurate, and tris[2-(3-mercaptobutyryloxy)ethyl] isocyanurate; alkylthiols, such as ethanethiol, 2-methylpropane-2-thiol, n-dodecanethiol, 2,3,3,4,4,5-hexamethylhexane-2-thiol (tert-dodecanethiol), ethane-1,2-dithiol, propane-1,3-dithiol, and benzylthiol; aromatic thiols, such as benzenethiol, 3-methylbenzenethiol, 4-methylbenzenethiol, naphthalene-2-thiol, pyridine-2-thiol, benzimidazole-2-thiol, and benzothiazole-2-thiol; mercaptoalcohols, such as 2-mercaptoethanol and 4-mercapto-1-butanol; and silane-containing thiols, such as 3-(trimethoxysilyl)propane-1-thiol and 3-(triethoxysilyl)propane-1-thiol; disulfide compounds, for example, alkyl disulfides, such as diethyl disulfide, dipropyl disulfide, diisopropyl disulfide, dibutyl disulfide, di-tert-butyl disulfide, dipentyl disulfide, diisopentyl disulfide, dihexyl disulfide, dicyclohexyl disulfide, didecyl disulfide, bis(2,3,3,4,4,5-hexamethylhexan-2-yl) disulfide (di-tert-dodecyl disulfide), bis(2,2-diethoxyethyl) disulfide, bis(2-hydroxyethyl) disulfide, and dibenzyl disulfide;

aromatic disulfides, such as diphenyl disulfide, di-p-tolyl disulfide, di(pyridin-2-yl)pyridyl disulfide, di(benzimidazol-2-yl) disulfide, and di(benzothiazol-2-yl) disulfide; thiuram disulfides, such as tetramethylthiuram disulfide, tetraethylthiuram disulfide, tetrabutylthiuram disulfide, and bis(pentamethylene)thiuram disulfide; and α-methylstyrene dimers.

In the case of incorporation of a chain transfer agent, a single chain transfer agent may be used, or two or more chain transfer agents may be used in combination. The amount of the chain transfer agent is 0.01 to 20 parts by mass, more preferably 0.1 to 10 parts by mass, relative to 100 parts by mass of the total amount of the polymerizable components (i.e., the components (a) and (b)), or 100 parts by mass of the total amount of the components (a) to (c) (in the case of incorporation of the component (c)).

Examples of the aforementioned antioxidant include phenolic antioxidants, phosphoric acid-based antioxidants, and sulfide-based antioxidants. Of these, phenolic antioxidants are preferred.

Examples of phenolic antioxidants include IRGANOX (registered trademark) 245, 1010, 1035, 1076, and 1135 [available from BASF Japan Ltd.]; SUMILIZER (registered trademark) GA-80, GP, MDP-S, BBM-S, and WX-R [available from Sumitomo Chemical Co., Ltd.]; and ADK STAB (registered trademark) AO-20, AO-30, AO-40, AO-50, AO-60, AO-80, and AO-330 [available from ADEKA Corporation].

In the case of incorporation of an antioxidant, a single antioxidant may be used, or two or more antioxidants may be used in combination. The amount of the antioxidant is 0.01 to 20 parts by mass, more preferably 0.1 to 10 parts by mass, relative to 100 parts by mass of the total amount of the polymerizable components (i.e., the components (a) and (b)), or 100 parts by mass of the total amount of the components (a) to (c) (in the case of incorporation of the component (c)).

<Preparation Method for Optical Waveguide-Forming Composition>

No particular limitation is imposed on the preparation method for the optical waveguide-forming composition of the present invention. Examples of the preparation method include a method involving mixing of the components (a) and (b) and optionally the component (c) in predetermined proportions, and optional addition and mixing of other additives, to thereby form a homogeneous solution; a method involving mixing of at least a portion of at least two components of, for example, the components (a) to (c) to form a homogeneous solution, subsequent addition of the remaining portion of the components, and optional addition and mixing of other additives, to thereby form a homogeneous solution; and a method involving the use of a conventional solvent in addition to these components.

In the case of the use of a solvent, no particular limitation is imposed on the ratio of the solid content in the optical waveguide-forming composition of the present invention, so long as the components are homogeneously dissolved in the solvent. For example, the ratio of the solid content is 1 to 50% by mass, or 1 to 30% by mass, or 1 to 25% by mass. The term "solid content" as used herein refers to the value obtained by subtracting the amount of the solvent component from the total amount of all components of the optical waveguide-forming composition.

The solution of the optical waveguide-forming composition is preferably used after being filtered through, for example, a filter having a pore size of 0.05 to 5 μm.

<<Cured Product>>

The present invention is also directed to a cured product produced by light exposure (photocuring) of the optical waveguide-forming composition of the present invention or heating (thermal curing) of the composition.

Examples of exposure light include ultraviolet rays, electron beams, and X-rays. Examples of light sources usable for ultraviolet irradiation include sunlight, a chemical lamp, a low-pressure mercury lamp, a high-pressure mercury lamp, a metal halide lamp, a xenon lamp, and UV-LED. After completion of the light exposure, postexposure bake may be performed to stabilize the physical properties of the cured product. No particular limitation is imposed on the method of postexposure bake, but the postexposure bake is generally performed with, for example, a hot plate or an oven at 50 to 260° C. for 1 to 120 minutes.

No particular limitation is imposed on the heating conditions for thermal curing, but the thermal curing is generally performed at 50 to 300° C. for 1 to 120 minutes as appropriate. Examples of the heating means include, but are not particularly limited to, a hot plate and an oven.

The cured product produced by curing of the optical waveguide-forming composition of the present invention has a high refractive index of 1.57 or more at a wavelength of 1,550 nm. Thus, the cured product is suitable as a material for forming an optical waveguide.

<<Optical Waveguide>>

The present invention is also directed to an optical waveguide produced from the optical waveguide-forming composition of the present invention.

In the optical waveguide of the present invention, the optical waveguide-forming composition can be applied to both a material for forming a cladding of the optical waveguide and a material for forming a core of the optical waveguide. In particular, the composition is preferably applied to the core-forming material, since the cured product of the composition has a high refractive index.

The optical waveguide of the present invention may incorporate a cladding-forming material and a core-forming material appropriately selected from various material used for formation of a cladding and a core of a conventional optical waveguide; specifically, materials that are cured by photoirradiation or thermal treatment, for example, materials containing, as a main component, a silicone resin, an acrylic resin, a vinyl resin, an epoxy resin, a polyimide resin, a polyolefin resin, or a polynorbornene resin. Specifically, the cladding-forming material and the core-forming material may be selected from the aforementioned optical waveguide-forming composition and a variety of conventional materials, so that a cladding formed from the cladding-forming material has a refractive index lower than that of the center of a core formed from the core-forming material. The cladding-forming material may contain, for example, a light-absorbing material such as carbon black.

No particular limitation is imposed on the production method for the optical waveguide to which the present invention is directed. For example, the optical waveguide can be formed through a curing process; i.e., light exposure (photocuring) or heating (thermal curing) of the optical waveguide-forming composition of the present invention or any of the aforementioned various conventional materials. Typically, the optical waveguide can be formed by a lithography technique using a photomask; specifically, through a process including etching and development.

An optical waveguide (so-called optical pin) having a desired inclination angle with respect to the surface of a substrate, which is one embodiment of the optical waveguide of the present invention, can be suitably produced from the optical waveguide-forming composition.

Such an optical waveguide having a desired inclination angle can be suitably produced by the production method described in, for example, International Publication WO 2015/060190. Specifically, such an optical waveguide can be produced by the method including:

(1) a step of preparing an anti-reflective coating on a support;
(2) a step of applying the optical waveguide-forming composition onto the anti-reflective coating, and exposing the optical waveguide-forming composition, through a photomask, to light incident in a direction that is not perpendicular to the surface of the support, to thereby cure the composition; and
(3) a step of removing an unexposed portion of the optical waveguide-forming composition by development.

No particular limitation is imposed on the aforementioned anti-reflective coating. Preferred is, for example, an anti-reflective coating formed from the composition for forming an anti-reflective coating described in International Publication WO 2015/060190 (i.e., a polymerizable composition containing an ultraviolet absorber and a reactive silicone compound prepared by polycondensation of a diarylsilicic acid compound having a specific structure and an alkoxysilane compound having a specific structure in the presence of an acid or a base).

The optical waveguide-forming composition can also be suitably used for production of a graded-index type (GI type) optical waveguide by the production method described in, for example, International Publication WO 2013/002013; i.e., an injection method (so-called Mosquito method) in which a core-forming curable resin is injected for wire drawing into a cladding-forming curable resin with a dispenser.

EXAMPLES

The present invention will next be described in more detail by way of examples, but the present invention is not limited to the following examples.

In the examples, the following apparatuses and conditions were used for preparation of samples and analysis of properties.

(1) Stirring and Defoaming Machine
Apparatus: planetary centrifugal mixer Awatori Rentaro (registered trademark) ARE-310, available from THINKY CORPORATION (2) Gel Permeation Chromatography (GPC)
Apparatus: Prominence (registered trademark) GPC system, available from SHIMADZU CORPORATION
Column: Shodex (registered trademark) GPC KF-804L and GPC KF-803L, available from Showa Denko K.K.
Column temperature: 40'C
Solvent: tetrahydrofuran
Detector: RI
Calibration curve: standard polystyrene (3) Gas Chromatography (GC)
Apparatus: GC-2010, available from SHIMADZU CORPORATION
Column: TC-17 (inner diameter: 0.25 mm, film thickness: 0.25 µm, length: 30 m), available from GL Sciences Inc.
Column temperature: 40° C. (5 minutes)—5° C./minute—120° C.—30° C./minute—250° C. (5 minutes)
Detector: FID
Carrier gas: nitrogen (total flow rate: 68.3 mL/minute)

(4) Propagation Loss
Apparatus: UV-VIS-NIR spectrophotometer UV-3600, available from SHIMADZU CORPORATION (5) Refractive Index
Apparatus: Prism Coupler Model 2010/M, available from Metricon
Measurement temperature: room temperature (about 23° C.)

(6) UV Exposure
Apparatus: batch-type UV irradiator (high-pressure mercury lamp, 2 kW×one lamp), available from EYE GRAPHICS CO., LTD.

(7) Mask Aligner
Apparatus: MA6, available from SUSS MicroTec
Lamp: high-pressure mercury lamp
Filter: i-ray bandpass filter
Illuminance: 16 mW/cm$^2$ (detected at 365 nm)
(8) Scanning Electron Microscope (SEM)
Apparatus: field emission scanning electron microscope S-4800, available from Hitachi High-Technologies Corporation
(9) UV Spot Light Source
Apparatus: 300 W xenon light source MAX-302, available from Asahi Spectra Co., Ltd.
Filter: narrow-band bandpass filter LX0365 (center wavelength: 365 nm), available from Asahi Spectra Co., Ltd.
(10) Microscope
Apparatus: digital microscope KH-7700, available from HIROX CO., LTD.

The following abbreviations have the indicated meanings.
STMS: trimethoxy(4-vinylphenyl)silane [available from Shin-Etsu Chemical Co., Ltd.]
PTMS: trimethoxy(phenyl)silane [available from Shin-Etsu Chemical Co., Ltd.]
TEAH: 35% by mass aqueous tetraethylammonium hydroxide solution [available from Aldrich]
ACSQ: 3-acryloyloxypropyl group-containing silsesquioxane [AC-SQ TA-100, acrylic equivalent: 165 g/eq, available from TOAGOSEI CO., LTD.]
FDA: bisarylfluorene diacrylate [OGSOL (registered trademark) EA-F5503, available from Osaka Gas Chemicals Co., Ltd.]
BnA: benzyl acrylate [Viscoat #160, available from Osaka Organic Chemical Industry Ltd.]
DDT: n-dodecanethiol [THIOKALCOL 20, available from Kao Corporation]
I1010: pentaerythritol tetrakis[3-(3,5-di-tert-butyl-4-hydroxyphenyl)propionate][IRGANOX (registered trademark) 1010, available from BASF Japan Ltd.]
I184: 1-hydroxycyclohexyl phenyl ketone [IRGACURE (registered trademark) 184, available from BASF Japan Ltd.]
TPO: diphenyl(2,4,6-trimethylbenzoyl)phosphine oxide [IRGACURE (registered trademark) TPO, available from BASF Japan Ltd.]
DPSD: diphenylsilanediol [available from Tokyo Chemical Industry Co., Ltd.]
DVB: divinylbenzene [DVB-810, available from NIPPON STEEL & SUMIKIN CHEMICAL CO., LTD.]
T3842: benzotriazole-based ultraviolet absorber [TINUVIN 384-2, available from BASF Japan Ltd.]
IPA: isopropyl alcohol
MIBK: methyl isobutyl ketone
PGME: propylene glycol monomethyl ether
PGMEA: propylene glycol monomethyl ether acetate
THF: tetrahydrofuran

[Production Example 1] Production of Reactive Silsesquioxane Compound 1 (SQ1)/BnA Solution A 200 mL reaction flask equipped with a condenser was charged with 2.97 g (7.1 mmol) of TEAH, 9.52 g (528 mmol) of ion-exchange water, and 90 g of THF, and the air in the flask was purged with nitrogen by using a nitrogen balloon. A mixture of 39.6 g (177 mmol) of STMS and 35.0 g (177 mmol) of PTMS was added dropwise to the flask over 10 minutes, and then the resultant mixture was stirred at 40° C. for 16 hours. To the reaction mixture was added 7.9 g of a cation-exchange resin [Amberlyst (registered trademark) 15JWET, available from Dow Chemical Company] that had been previously washed with THF. The mixture was stirred for one hour, and then the reaction was terminated. The resultant mixture was cooled to room temperature (about 23° C.). Thereafter, the cation-exchange resin was filtered with a membrane filter having a pore size of 0.2 μm, and then washed off with 15 g of ethyl acetate. The filtrate and washings were combined to prepare a solution, and 9.3 g of BnA was added to and uniformly mixed with the solution. Subsequently, THF, ethyl acetate, remaining water, and other volatiles were distilled off with a rotary evaporator under reduced pressure, to thereby produce a reactive silsesquioxane compound 1 (hereinafter may be abbreviated as "SQ1")/BnA solution.

SQ1 was found to have a weight average molecular weight Mw of 4,000 in terms of polystyrene as determined by GPC, and a degree of distribution Mw (weight average molecular weight)/Mn (number average molecular weight) of 1.8. The resultant solution was found to have an SQ1 content of 75% by mass and a BnA content of 25% by mass as determined by GC quantitative analysis.

[Referential Example 1] Production of Reactive Silicone Compound

A 1 L eggplant-shaped flask equipped with a cooler was charged with 177 g (0.80 mol) of DPSD, 179 g (0.80 mol) of STMS, and 141 g of toluene, and the air in the flask was purged with nitrogen by using a nitrogen balloon. The reaction mixture was heated to 50° C., and then 0.303 g (1.6 mmol) of barium hydroxide monohydrate [available from Aldrich] was added to the flask. The mixture was further stirred at 50° C. for two days for dealcoholization condensation. The resultant reaction mixture was cooled to room temperature (about 23° C.), and insoluble matter was removed with a membrane filter having a pore size of 0.2 μm. Toluene and methanol (i.e., a byproduct) were distilled off from the reaction mixture with a rotary evaporator under reduced pressure at 50° C., to thereby produce 305 g of a reactive silicone compound as a colorless transparent oily product.

The resultant reactive silicone compound was found to have an Mw of 1,600 in terms of polystyrene as determined by GPC and a degree of distribution Mw/Mn of 1.3.

[Example 1] Preparation of Optical Waveguide-Forming Composition 1

54.3 Parts by mass of the SQ1/BnA solution produced in Production Example 1 (SQ1: 40.7 parts by mass, BnA: 13.6 parts by mass) serving as a mixture of the reactive silsesquioxane compound (a) and the (meth)acrylate compound (c) was mixed with 42.7 parts by mass of FDA serving as the fluorene compound (b), 3.0 parts by mass of BnA serving as the (meth)acrylate compound (c) (i.e., the total amount of BnA was 16.6 parts by mass (inclusive of BnA contained in the SQ1/BnA solution)), 0.5 parts by mass of DDT serving as a chain transfer agent (reaction accelerator), 0.5 parts by mass of I1010 serving as an antioxidant, and 2 parts by mass of I184 and 0.5 parts by mass of TPO serving as polymerization initiators, and the resultant mixture was stirred at 50° C. for three hours. Subsequently, the mixture was defoamed with stirring for 10 minutes, to thereby prepare an optical waveguide-forming composition 1.

[Comparative Examples 1 and 2] Preparation of Optical Waveguide-Forming Compositions 51 and 52

Optical waveguide-forming compositions 51 and 52 were prepared in the same manner as in Example 1, except that the proportions of the components were varied as shown in Table 1. In Table 1, the term "parts" refers to "parts by mass."

TABLE 1

| Example/ Comparative Example | Optical waveguide-forming composition | (a) Silsesquioxane | [Parts] | (b) FDA [Parts] | BnA [Parts] | DDT [Parts] | I1010 [Parts] | I184 [Parts] | TPO [Parts] |
|---|---|---|---|---|---|---|---|---|---|
| Example 1 | Optical waveguide-forming composition 1 | SQ1 | 40.7 | 42.7 | 16.6 | 0.5 | 0.5 | 2 | 0.5 |
| Comparative Example 1 | Optical waveguide-forming composition 51 | ACSQ | 40.7 | 42.7 | 16.6 | 0.5 | 0.5 | 2 | 0.5 |
| Comparative Example 2 | Optical waveguide-forming composition 52 | SQ1 | 71.0 | — | 29.0 | 0.5 | 0.5 | 2 | 0.5 |

[Evaluation of Propagation Loss of Optical Waveguide-Forming Composition]

Each composition was diluted with an equal volume of toluene that had been previously filtered with a filter having a pore size of 0.2 μm, to thereby prepare a 50% by volume solution of the composition in toluene. The absorbance A of the solution was measured by using a glass cell having an optical path length of 1 cm, and the absorbance $A_{tol}$ of toluene was measured by using a glass cell having an optical path length of 0.5 cm. The propagation loss of the composition was calculated by using the following formula. The results are shown in Table 2.

Propagation loss [dB/cm]=$(A-A_{tol})\times 2\times 10$

A: the absorbance of the solution of an optical waveguide-forming composition in toluene at an optical path length of 1 cm $A_{tol}$: the absorbance of toluene at an optical path length of 0.5 cm

[Preparation of Cured Product and Evaluation of Refractive Index Thereof]

Each composition was applied dropwise onto a silicon wafer, and the composition and a silicone rubber spacer having a thickness of 50 μm were sandwiched between the silicon wafer and a glass substrate treated with a release agent. The sandwiched composition was exposed through the glass substrate to UV light (20 mW/cm$^2$) for 150 seconds in a nitrogen atmosphere. Thereafter, the glass substrate was removed to thereby prepare a cured product having a thickness of 50 μm.

The refractive index of the cured product was evaluated at wavelengths of 850 nm, 1,310 nm, and 1,550 nm. The results are shown in Table 2. The refractive index at 850 nm was calculated according to the Cauchy's dispersion formula.

As shown in Table 2, the composition (Example 1) containing SQ1 as the reactive silsesquioxane compound was found to have a low propagation loss even in a long wavelength region, such as 1,310 nm or 1,550 nm. In contrast, the composition (Comparative Example 1) containing ACSQ was found to have a high propagation loss at 1,550 nm. This is probably attributed to the substituted alkyl group included in the structural unit of ACSQ. The cured product prepared from the composition of Example 1 exhibited a high refractive index of 1.57 or more at all these wavelengths. In contrast, the cured products prepared from the compositions of Comparative Examples 1 and 2 exhibited a low refractive index of less than 1.57 at all these wavelengths.

[Example 2] Production of Optical Waveguide 1

The optical waveguide-forming composition 1 prepared in Example 1 was applied by spin coating (1,500 rpm×30 seconds) onto a silicon wafer having a thermally oxidized film (thickness: 2 μm) on the surface, and the composition was heated with a hot plate at 100° C. for one minute. The resultant coating film was subjected to pattern exposure at 16 mW/cm$^2$ for 125 seconds with a mask aligner (mask width: 60 μm). An unexposed portion of the composition was washed off with a PGMEA/PGME mixture (mass ratio of 7:3). Thereafter, the exposed composition was heated with a hot plate at 110° C. for one minute and then at 150° C. for 20 minutes, to thereby produce a linear optical waveguide having a width of 48 μm, a height of 31 μm, and a length of 7 cm. FIG. 1 shows an image of the optical waveguide as observed with an SEM.

[Example 3] Production of Optical Waveguide 2

20 Parts by mass of DVB was added to and uniformly mixed with 80 parts by mass of the reactive silicone com-

TABLE 2

| Example/ Comparative Example | Optical waveguide-forming composition | Propagation loss [dB/cm] | | | Refractive index | | |
|---|---|---|---|---|---|---|---|
| | | 850 nm | 1,310 nm | 1,550 nm | 850 nm | 1,310 nm | 1,550 nm |
| Example 1 | Optical waveguide-forming composition 1 | 0.03 | 0.26 | 0.66 | 1.583 | 1.583 | 1.575 |
| Comparative Example 1 | Optical waveguide-forming composition 51 | 0.04 | 0.31 | 1.23 | 1.550 | 1.551 | 1.543 |
| Comparative Example 2 | Optical waveguide-forming composition 52 | 0.04 | 0.25 | 0.66 | 1.562 | 1.562 | 1.555 | pound produced in Referential Example 1 by using a stirring and defoaming machine. To the mixture were added 3 parts by mass of T3842 serving as an ultraviolet absorber and 3 parts by mass of TPO serving as a polymerization initiator. The resultant mixture was stirred at 50° C. for three hours, and then defoamed for 10 minutes with stirring, to thereby prepare a composition for forming an anti-reflective coating. The composition was applied by spin coating (2,000 rpm×30 seconds) onto a silicon wafer. The resultant coating film was subjected to UV exposure at 20 mW/cm² for 150 seconds in a nitrogen atmosphere, and then heated with a hot plate at 150° C. for 10 minutes, to thereby form an anti-reflective coating having a thickness of 10 μm.

Figure 2:
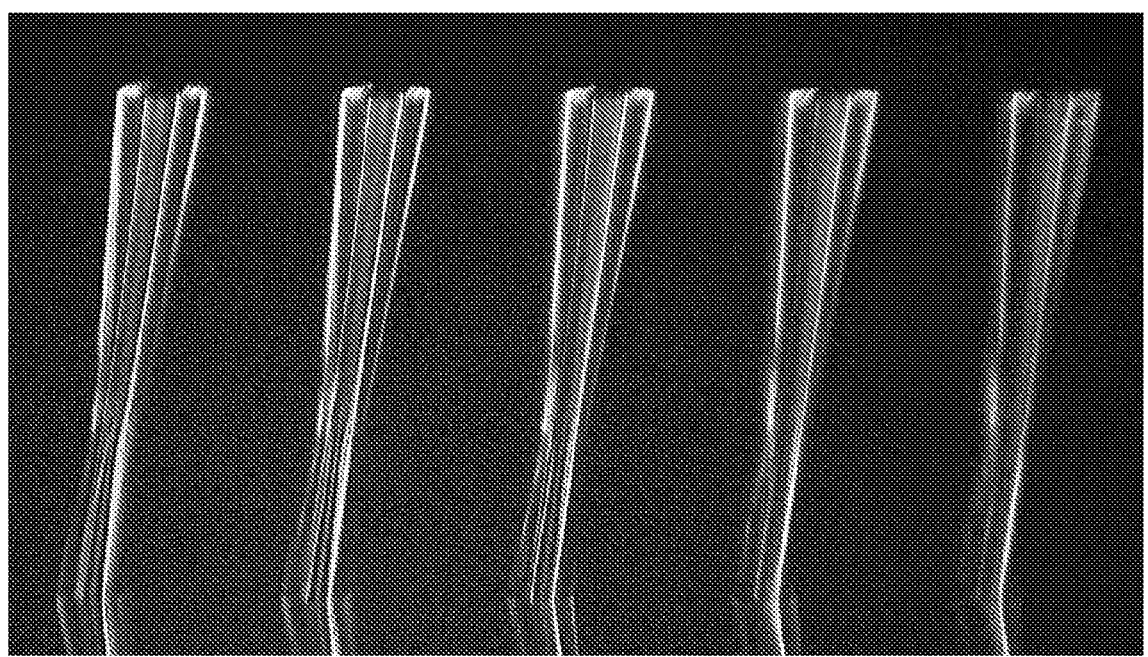
FIG. 2 shows an image of optical waveguides produced in Example 3 as observed with a microscope.

Subsequently, 100 mg of the optical waveguide-forming composition 1 prepared in Example 1 was applied dropwise onto the anti-reflective coating. A photomask having three circular openings (diameter: 50 μm) was placed on the optical waveguide-forming composition, and a silicone rubber spacer having a thickness of 300 μm was disposed so as to be sandwiched between the photomask and the anti-reflective coating. A light guide of a UV spot light source was provided above the photomask so as to be inclined by 10° with respect to the vertical direction, and the composition was subjected to UV exposure at 10 mW/cm² for three minutes. An unexposed portion of the composition was washed off with an MIBK/IPA mixture (mass ratio of 1:1), to thereby produce inclined columnar optical waveguides having a diameter of 50 μm and a height of 300 μm. FIG. 2 shows an image of the resultant optical waveguides as observed with a microscope. The optical waveguides had an inclination angle (i.e., an angle with respect to the silicon wafer surface) of 80°.

As described above, the optical waveguide-forming composition of the present invention was found to have a low optical propagation loss even in a long wavelength region (e.g., 1,550 nm), and the cured product of the composition was found to have superior optical characteristics; i.e., a high refractive index of 1.57 or more.

It was also found that the optical waveguide-forming composition of the present invention can produce an optical waveguide by photolithography and can produce an optical waveguide having a desired inclination angle with respect to the surface of a substrate.

The invention claimed is:

1. An optical waveguide-forming composition comprising:
   (a) 100 parts by mass of a reactive silsesquioxane compound that is a polycondensation product of an alkoxysilane compound A of the following Formula [1]:

$$Ar^1\text{—}Si(OR^1)_3 \quad [1]$$

wherein $Ar^1$ is a phenyl group having at least one group having a polymerizable double bond, a naphthyl group having at least one group having a polymerizable double bond, or a biphenyl group having at least one group having a polymerizable double bond; and $R^1$ is a methyl group or an ethyl group, and an alkoxysilane compound B of the following Formula [2]:

$$Ar^2\text{—}Si(OR^2)_3 \quad [2]$$

wherein $Ar^2$ is a phenyl group optionally substituted with a $C_{1-6}$ alkyl group, a condensed polycyclic aromatic hydrocarbon group optionally substituted with a $C_{1-6}$ alkyl group, or a hydrocarbon ring assembly group (optionally substituted with a $C_{1-6}$ alkyl group) in which a plurality of aromatic rings are directly joined by a single bond; and $R^2$ is a methyl group or an ethyl group and;
   (b) 10 to 500 parts by mass of a fluorene compound of the following Formula [3]:

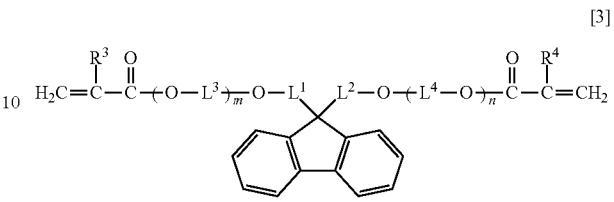

wherein $R^3$ and $R^4$ are each independently a hydrogen atom or a methyl group; $L^1$ and $L^2$ are each independently a phenylene group optionally having a substituent or a naphthalenediyl group optionally having a substituent; $L^3$ and $L^4$ are each independently a $C_{1-6}$ alkylene group; and m and n are each zero or a positive integer such that m+n is 0 to 40.

2. The optical waveguide-forming composition according to claim 1, wherein the composition further comprises (c) 1 to 100 parts by mass of a (meth)acrylate compound not belonging to the fluorene compound (b) relative to 100 parts by mass of the total amount of the reactive silsesquioxane compound (a) and the fluorene compound (b).

3. The optical waveguide-forming composition according to claim 2, wherein the (meth)acrylate compound (c) comprises at least an aromatic ring-containing (meth)acrylate compound.

4. The optical waveguide-forming composition according to claim 2, wherein the (meth)acrylate compound (c) comprises at least a mono(meth)acrylate compound.

5. The optical waveguide-forming composition according to claim 2, wherein the (meth)acrylate compound (c) comprises at least an aromatic ring-containing mono(meth)acrylate compound.

6. The optical waveguide-forming composition according to claim 1, wherein the reactive silsesquioxane compound (a) is a polycondensation product of a compound of the following Formula [1a]:

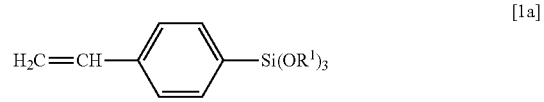

wherein $R^1$ has the same meaning as defined above and a compound of the following Formula [2a]:

wherein $R^2$ has the same meaning as defined above.

7. A cured product produced by curing the optical waveguide-forming composition according to claim 1.

8. An optical waveguide produced from the optical waveguide-forming composition according to claim 1.

* * * * *